United States Patent [19]

Jenkins et al.

[11] Patent Number: 5,199,705
[45] Date of Patent: Apr. 6, 1993

[54] BASEBALL RADAR SPEED SENSOR AND CATCHER'S CHEST PROTECTOR

[75] Inventors: Nevin C. Jenkins, Homosassa; Rande W. Newberry, Palm Harbor, both of Fla.

[73] Assignee: Sports Radar, Inc., Homosassa, Fla.

[21] Appl. No.: 804,929

[22] Filed: Dec. 11, 1991

[51] Int. Cl.⁵ .................................................. A63B 69/40
[52] U.S. Cl. ...................................... 273/26 C; 273/25
[58] Field of Search .............. 273/26 C, 25; 342/103, 342/115, 2.5, 2; 343/718; 235/105; 280/87.2

[56] References Cited

U.S. PATENT DOCUMENTS

| | | |
|---|---|---|
| 3,076,197 | 2/1963 | Glahe . |
| 3,125,762 | 3/1964 | Glahe . |
| 3,574,861 | 4/1971 | Hale . |
| 4,276,548 | 6/1981 | Lutz . |
| 4,525,875 | 7/1985 | Tomczak . |
| 4,657,250 | 4/1987 | Newland et al. ............ 273/26 A |
| 4,770,527 | 9/1988 | Park ............................... 273/26 A |
| 4,847,913 | 7/1989 | Chen . |
| 4,949,972 | 8/1990 | Goodwin et al. ............ 273/26 A |

FOREIGN PATENT DOCUMENTS 1565688  3/1969  France ....................... 273/25

Primary Examiner—Theatrice Brown
Attorney, Agent, or Firm—Keck, Mahin & Cate

[57] ABSTRACT

A chest protector worn by a catcher and a speed meter built in or mounted on the chest protector. A transmitter transmits speed information of a ball thrown by a pitcher to the catcher positioned at a remote distance. The speed information of the ball can be encoded before transmission and decoded afterwards.

7 Claims, 2 Drawing Sheets

BASEBALL RADAR SPEED SENSOR AND CATCHER'S CHEST PROTECTOR

FIELD OF THE INVENTION

The present invention relates to a novel apparatus for sensing and displaying data regarding the relative velocity of an object such as a baseball, and for transmitting the data to a remote location.

BACKGROUND OF THE INVENTION

A microwave speed meter has been developed for measuring the velocity of a baseball, see U.S. Pat. No. 4,276,548. A need has been perceived for using such a speed meter in a unique way, for which no apparatus is presently known.

SUMMARY OF THE INVENTION

The present invention provides a unique way to obtain data regarding the relative velocity of a baseball, hockey puck, softball and the like during the course of a game or the like. This is accomplished by providing apparatus of the kind worn by a catcher or a goalie, etc., and incorporating therein a speed meter which reads out to a display via a privacy encoder for instantaneous monitoring of a pitcher's performance during a game. Also, a transmitter is included for broadcast to a remote location, such as a dugout or bullpen.

The object of the invention is to enable, on site, instantaneous monitoring of a pitcher's performance during a game or the like, and to transmit data regarding the pitching speed to remote locations.

The above and other objects and advantages of the invention will become more readily apparent from the following detailed description when taken in conjunction with the drawings.

DETAILED DESCRIPTION OF THE PREFERRED EMBODIMENT

Figure 1:
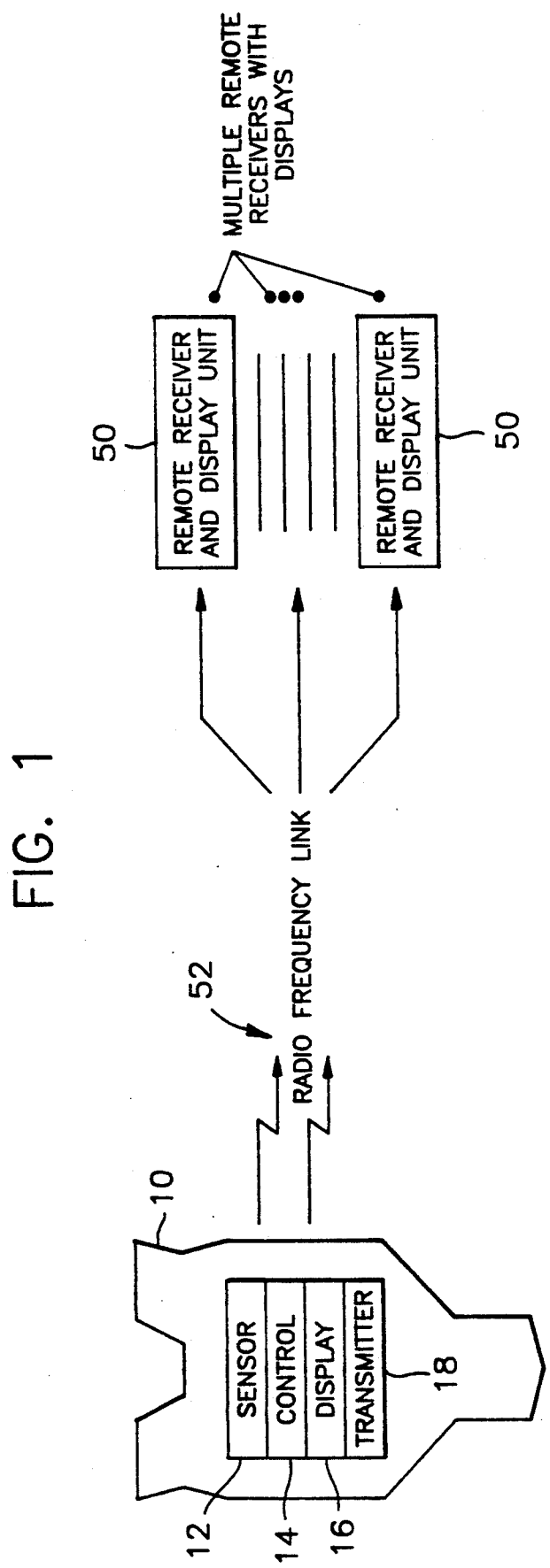
FIG. 1 is a schematic view showing the apparatus or system of the present invention.

Referring now to the drawings, the following is a detailed description of a preferred embodiment. As shown in FIG. 1, a catcher's chest protector 10 has incorporated therein a device including a sensor 12, a control 14, a display 16 and a transmitter 18 mounted in the protector 10. Protector 10 can be of any known or conventional design, such as shown in U.S. Pat. Nos. 3,076,197; 3,125,762; 3,574,861; 4,525,875 or 4,847,913, with the components 12-18 built in or mounted thereon, such as sewn into the protector 10. Sensor 12 can be a doppler radar unit capable of detecting the velocity of a baseball and senses the relative velocity of a baseball moving toward the catcher from the pitcher and to this end an antenna is included as part of sensor 12. The control unit 14 is an electronic circuit of known design that will calibrate or measure the velocity of the baseball, or other moving object, in miles per hour or other useful units. The display unit 16 is an electronic circuit of known design that will display velocity and is positioned on the protector 10 or otherwise so the wearer of the protector (the catcher) can see and read it readily. Transmitter 18 is an RF transmitter of known design that will transmit the velocity information. Power is provided by either batteries and/or an external DC source.

Figure 2:
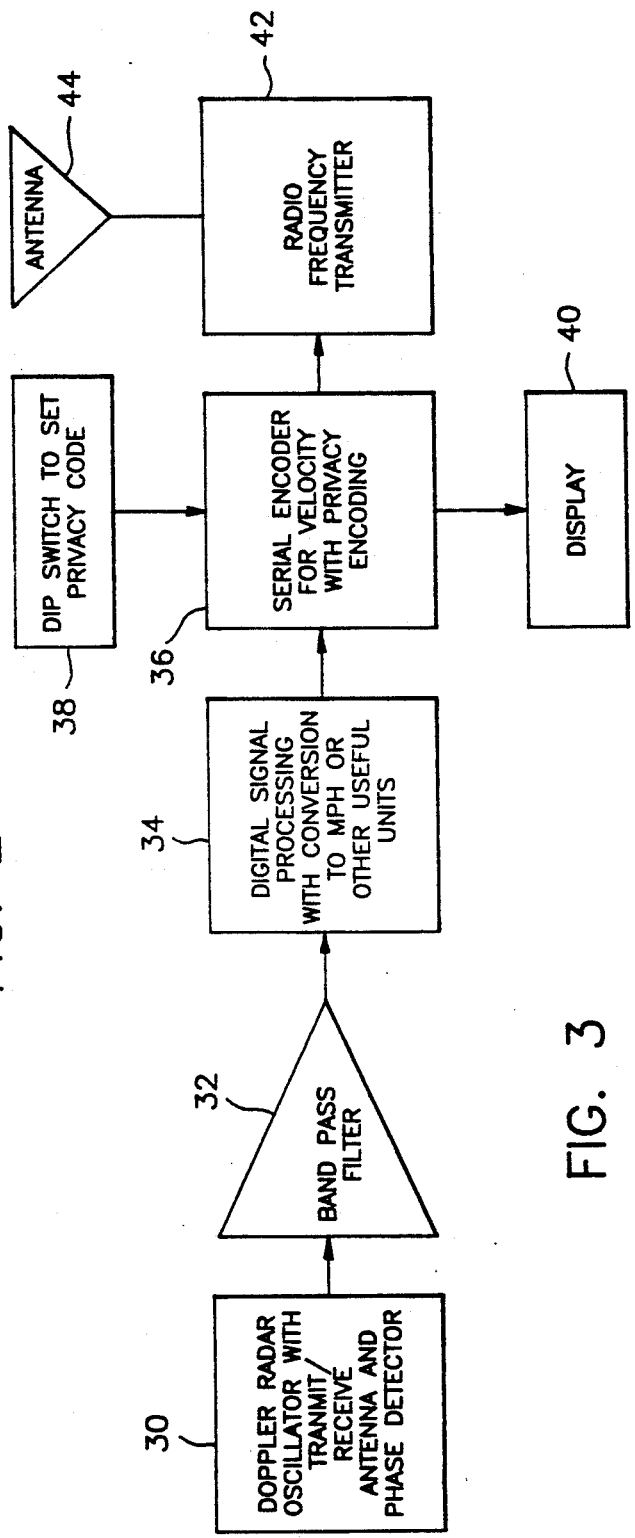
FIG. 2 is a block diagram of the portion incorporated in a catcher's chest protector.

A block diagram of the components mounted on the protector 10 is shown in more detail in FIG. 2. The sensor 12 includes a Doppler radar oscillator system with transmit and receive antenna and a phase detector 30 which connects with band pass filter 32. The output of filter 32 is fed to a digital signal processor 34 with conversion to MPH or other useful units. Components 30-34 are conventional and known, see e.g. U.S. Pat. No. 4,276,548. The output of processor 34 is fed to a conventional and known serial encoder 36 which is arranged for encoding the velocity data output of processor 34 with a privacy code. A known dip switch 38 is connected to control encoder 36 to set or reset a privacy code, as desired. The coded output of encoder 36 is displayed in known display 40 and fed to a known RF transmitter 42 transmitting via antenna 44 to nearby remote locations, such as, the dugout, the bullpen and like.

Figure 3:
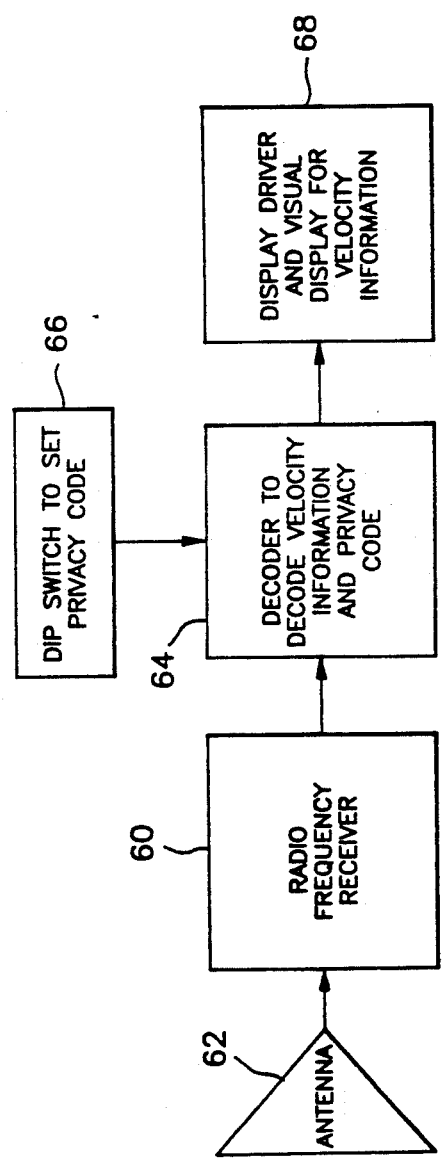
FIG. 3 is a block diagram of a remote display unit.

The equipment or apparatus 50, at a remote location, constitutes the other end of an RF link 52 and is capable of receiving the RF signals from the transmitter 18 in the protector or garment 10 and processing same to display the velocity information. A plurality (five are shown) remote units can be used with the protector or garment 10. A functional block diagram of a remote display unit is shown in FIG. 3 and consists of an RF receiver 60 fed by antenna 62 and outputting to a decoder 64 of known design to decode velocity information and privacy code. A dip switch 66 of known design is coupled to decoder 64 to set the privacy code for decoding. The output of decoder 64 feeds to a display driver and visual display 68 of known design for displaying velocity information for direct read out. If desired, display 68 can display the encoded velocity information or no privacy code is used when displaying in display 40.

Other modifications and changes can be made which do not depart from the spirit and scope of the invention as claimed.

The foregoing description is intended by way of example only and is not intended to limit the present invention in any way except as set forth in the following claims.

What is claimed is:

1. The combination of a body garment and sensing means mounted on said body garment; said body garment being a chest protector worn by a catcher and said sensing means being means to measure the relative velocity of a ball thrown towards the catcher wearing said body garment; said sensing means includes display means for a readout of the velocity of the ball to be readable the catcher.

2. The combination of claim 1, wherein said sensing means further include encoding means for encoding the sensed relative velocity.

3. The combination of claim 2 wherein the encoding means includes selectable means for setting the encoding means with a privacy code.

4. The combination of claim 1 further including transmitter means for transmitting the sensed relative velocity to a remote location.

5. The combination of claim 4 further including receiver means at a remote location for receiving transmitted sensed relative velocity and displaying same.

6. The combination of claim 5 wherein encoding and decoding means are provided for encoding sensed relative velocity and for decoding transmitted sensed relative velocity.

7. The combination of claim 5 wherein the relative velocity is displayed in linear units per unit of time.

* * * * *